Sept. 29, 1942.        R. G. LE TOURNEAU        2,297,106
RELEASING ATTACHMENT FOR CHUCK
Filed May 1, 1942

INVENTOR.
R. G. LeTourneau
BY
ATTORNEYS

Patented Sept. 29, 1942

2,297,106

UNITED STATES PATENT OFFICE 2,297,106

RELEASING ATTACHMENT FOR CHUCK

Robert Gilmore Le Tourneau, Peoria, Ill., assignor to R. G. Le Tourneau, Inc., Stockton, Calif., a corporation of California Application May 1, 1942, Serial No. 441,294

4 Claims. (Cl. 279—9)

This invention relates to milling machines or lathes, and particularly to a chuck for holding work, such as shell casings, having a tapering portion at its forward end or nose, and on which end the operation, such as boring, tapping or end facing, is to be performed.

The chuck is of that general type which is incorporated in a rotary spindle in which the shell casing is supported, and which is so constructed that it acts to wedgingly engage the taper portion of the work and hold the same against rotation relative to the spindle, without the use of any releasable holding jaws or similar members. In such cases the work must ordinarily be driven out in order to free the wedging grip.

The principal object of this invention is to provide a device by means of which this grip on the shell will be automatically broken when it is desired to do so, and thus permitting the shell to be readily withdrawn without using external and possibly damaging force to free the grip.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
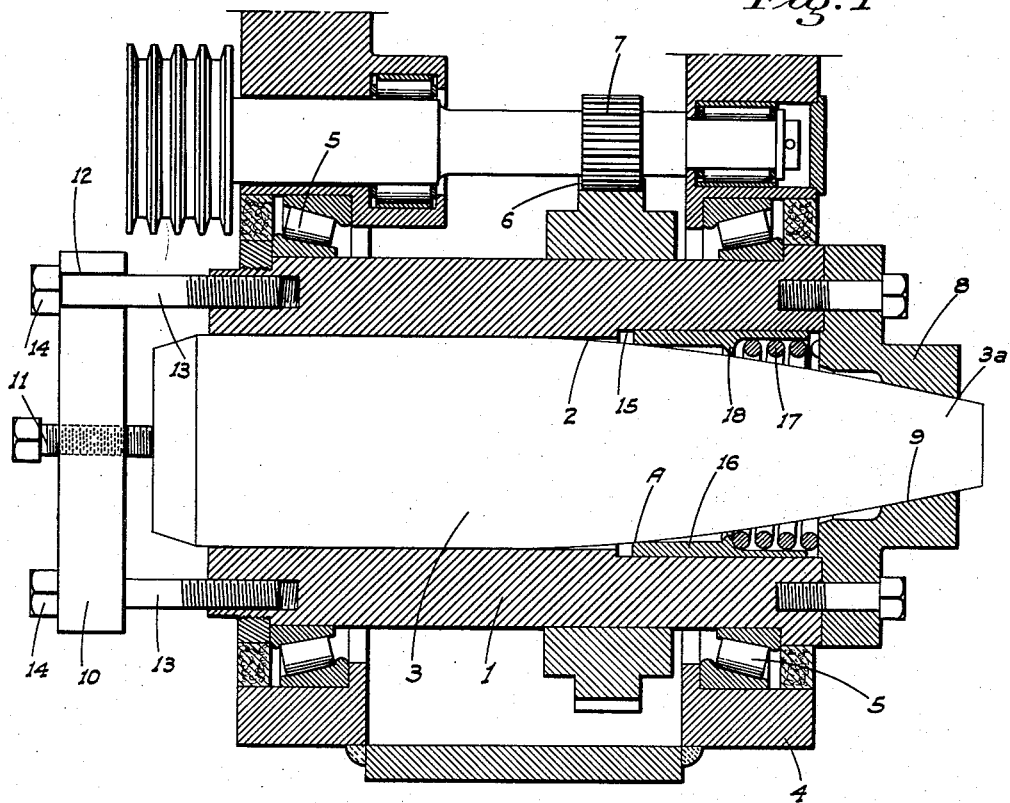
Figure 1 is a sectional plan of a work holding spindle and chuck including the work releasing attachment.
Figure 2:
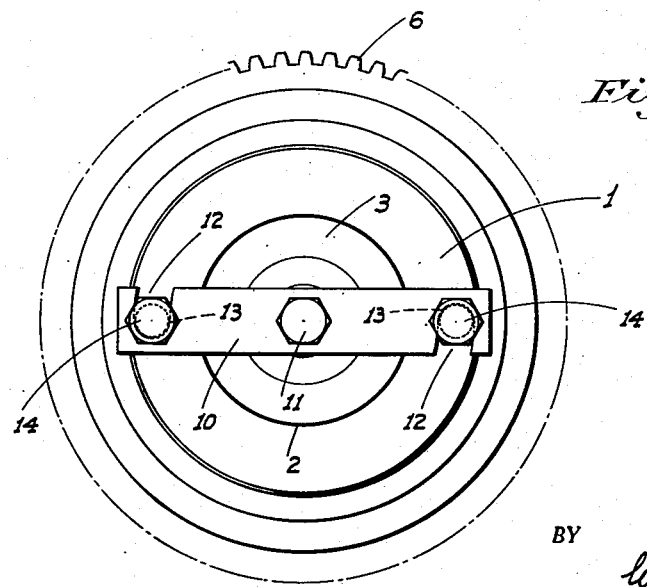
Figure 2 is a rear end view of the spindle detached, shown in connection with the work retaining cross bar.

Referring now more particularly to the characters of reference on the drawing, the tubular rotary spindle having a bore 2 at its rear end to fit the shell casing 3 to be worked, is mounted in connection with a housing 4 in which the spindle is journaled for free rotation, as at 5. Within the housing the spindle is here shown as provided with a gear 6 engaged by a driving pinion 7.

Removably secured on the forward end of the spindle is a chuck head 8, taper-bored as at 9 to fit the taper of the nose end 3a of the shell casing, which then projects from the head for engagement with a suitable tool.

In order to wedge the nose into the chuck and hold the same against rotation relative to the spindle, I mount a cross bar 10 across the shell at its base, said bar having an axial cap screw 11 threaded therethrough to engage the base end of the shell. Adjacent its ends the bar is oppositely notched as at 12 for releasable engagement, when rotated relative to the spindle, with bolts 13 under their heads 14; these bolts being adjustably mounted in the rear end of the spindle in diametrally opposed relation.

The spindle for some distance rearwardly from the head is provided with an enlarged bore 15 in which a sleeve 16 is slidably disposed. The bore of the sleeve is slightly less than the diameter of the bore 2 or the straight portion of the shell casing, so that at its rear end said sleeve bites against the taper of the nose portion, as at A. A compression spring 17 in the forward portion of the sleeve extends between and engages the overhanging head and an inwardly projecting flange 18 on the sleeve.

When the shell casing is advanced into gripping position in the chuck head by tightening the screw 11 after the cross bar 10 is engaged with bolts 13, the sleeve 16 being then engaged with the shell nose, advances also, and the spring 17 is placed under compression. Then when the crossbar is released by rotating the same until it clears the bolts 13 the spring acts to retract the sleeve 16, forcing said shell back with it, and thus freeing the shell from its grip in the chuck head. The shell may then be readily withdrawn from the spindle, since it only has engagement with the sleeve over a very small area, and may thus be easily pulled clear of the same. While this device has been particularly designed for handling shell casings, it will be obvious that it is adapted for use with any cylindrical work having a portion tapering toward its forward exposed end and on which end lathe operations, either external or internal, are to be performed.

From the foregoing description it will be readily seen that I have produced such a device as substantially fulfills the objects of the invention as set forth herein.

While this specification sets forth in detail the present and preferred construction of the device, still in practice such deviations from such detail are resorted to as do not form a departure from the spirit of the invention, as defined by the appended claims.

Having thus described my invention, what I claim as new and useful and desire to secure by Letters Patent is:

1. In a lathe chuck for holding cylindrical work having a portion tapering toward its forward end, the chuck including a hollow member through which the work projects, a chuck head on the front end of the member having a taper bore symmetrical to that of the taper portion of the work and into which the latter projects; releasable means to advance and hold the work in wedging engagement with the head, and means in the member acting on the work when said releasable means is released to retract the work and break its wedging engagement with the head.

2. A structure as in claim 1, in which said releasable means includes opposed headed bolts projecting from the back end of the member, the work projecting to adjacent said back end of the member, and a cross bar having an element engaging the adjacent end of the work; the crossbar having opposed notches in opposite edges positioned to straddle the bolts under the heads thereof upon rotation of the bar from a position between the bolts.

3. In a lathe chuck for holding cylindrical work having a portion tapering toward its forward end, the chuck including a hollow member through which the work projects, a chuck head on the front end of the member having a taper bore symmetrical to that of the taper portion of the work and into which the latter projects; a compression spring within the member, acting when compressed in a direction to retract the work, an element between the spring and work adapted when the work is advanced to be engaged by and advanced with the work and to then place the spring under compression, and releasable means to advance and hold the work in wedging engagement with the head.

4. A structure as in claim 1 in which said last named means comprises a substantially straight-bore sleeve slidable in the member back of the head in surrounding relation to the adjacent taper portion, the bore of the sleeve at its rear end being of a size smaller than that of the rear end of the taper portion of the work to be engaged thereby and advanced as the work is advanced, and a compression spring between the spring and the front end of the member placed under compression by such advance of the sleeve.

ROBERT G. LE TOURNEAU.